Figure 1:
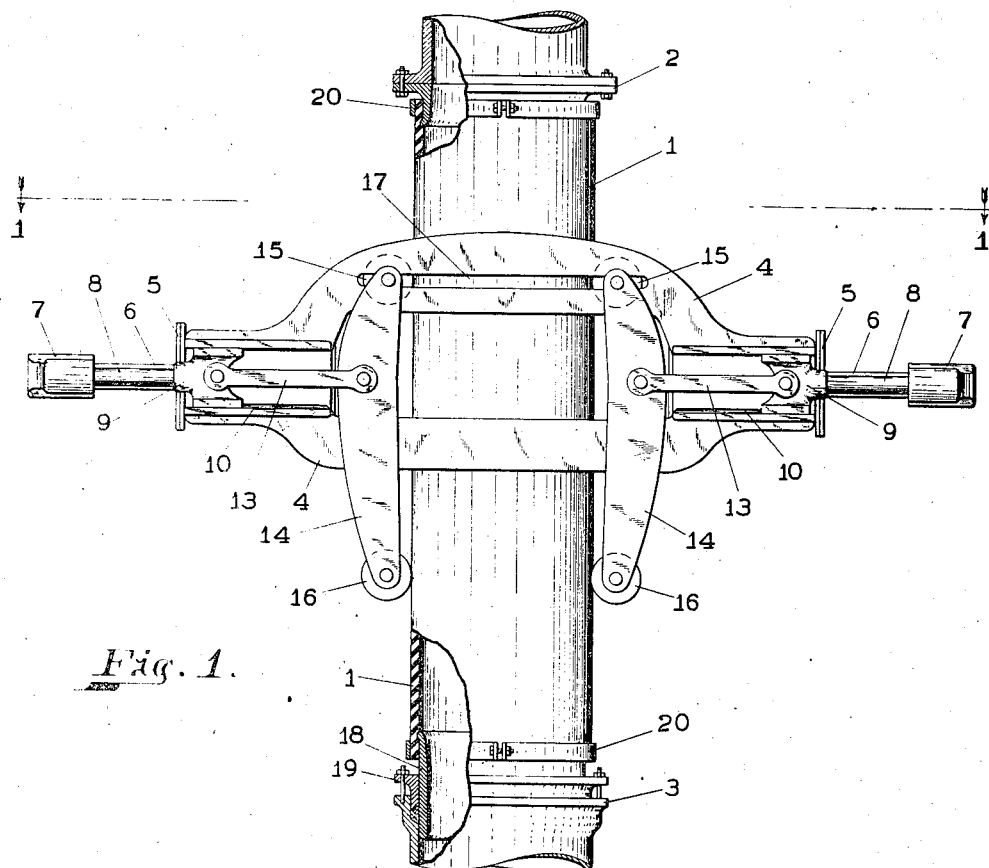

Dec. 19, 1939.    W. B. FOULKE    2,183,835
VALVE
Filed Feb. 25, 1938

INVENTOR.
WILLING B. FOULKE
BY
ATTORNEY.

Patented Dec. 19, 1939

2,183,835

UNITED STATES PATENT OFFICE 2,183,835

VALVE

Willing B. Foulke, Media, Pa., assignor to E. I. du Pont de Nemours & Company, Wilmington, Del., a corporation of Delaware Application February 25, 1938, Serial No. 192,597

6 Claims. (Cl. 251—5)

This invention relates to valves for controlling the flow of liquids, solids and mixtures of liquids and solids in pipelines, and especially for controlling the flow of mixtures of liquids and solids.

It is an object of this invention to provide mechanically operated means for closing pipelines used to convey liquids, solids and especially mixtures of liquids and solids in which the solid particles are of irregular shapes and sizes. It is a further object to provide a control mechanism for such pipelines in which the valve part subjected to wear is resistant to abrasion, and relatively inexpensive and simple to replace. A further object is to provide a control mechanism in which the working parts are completely out of contact with the materials being conveyed. A still further object is to provide a valve closing mechanism which will be free from the necessity of slow and laborious hand operation and in which any irregularities of operation due to solid particles in the material transfererd will be automatically compensated for by the inherent action of the mechanism. These and other objects will be evident in the description which follows:

Pipelines used for conveying liquids only are usually controlled by means of conventional types of valves. In some industrial processes, however, such as washing operations, the liquids may be mixed with particles of solid matter which interfere with the operation of the usual types of valves and make some special provision necessary.

The pipelines used for conveying such mixtures are likely to be of fairly large diameter because of the nature and volume of materials to be handled. The pipe sizes ordinarily used will probably vary from 12 to 16 inches in diameter but may be larger or smaller as the conditions demand.

The handling of liquids in pipelines, when such liquids contain in mixture therewith solid materials of varying degrees of subdivision, presents special problems whenever it is necessary to regulate or stop the flow of the liquid-solid mixture by means of valves. This is particularly true when the particle size of the solid is such as to cause appreciable obstruction in the valve mechanism. An expedient that has been used to overcome this difficulty in controlling the fluid flow is the installation, in a section of pipeline substantially vertical, of a pair of valves in series, separated by a section of pipe of any convenient length from one to several times the pipe diameter. Valves thus placed in series are sometimes referred to as tandem valves. The mode of operation of these valves in stopping the flow of the liquid-solid mixture is to close the upper valve either until it is fully seated, or until, as more frequently happens, it jams against a solid particle. When this occurs, the passage of the larger particles of solids is stopped but the liquids and some of the smaller solids continue to flow. The second valve is then closed to stop the flow of liquid. Usually the closing of the first valve will stop the passage of the solids sufficiently to allow the vertical section of the pipe between the valves to clear itself by gravity. Occasionally, however, the second valve will be blocked with a solid of such a size that neither gravity nor the reduced flow of liquid will carry it away. It then becomes necessary to re-open the upper valve to flush the pipe and start the operation of closing at the beginning. This may become a laborious and tedious operation, consuming much time on the part of the operator and causing excessive wear on the working parts of the valves because of the presence of abrasive materials.

It will be readily appreciated that the use of tandems of valves of the sizes required for this work is acompanied by many difficulties and disadvantages. Because of the pipe size the initial cost of the valves is a considerable item. Likewise the size and weight of the valves introduces a difficult installation problem requiring a very sizable outlay for labor and equipment. In addition to this, the abrasive quality of the materials handled causes very rapid deterioration of the valves, making frequent replacement necessary and greatly increasing the maintenance costs of the system. It is estimated that the cost of maintaining a set of valves may run from a few hundred to several thousand dollars a year depending upon the conditions of operation and the number of times the valves must be repaired and replaced because of the abrasive action of the materials. Added to the actual costs for replacements and labor there must also be considered the expense of having costly equipment frequently idle while repairs are made.

The present invention is designed to overcome these difficulties. Instead of two large size, expensive valves there is inserted in the pipeline with suitable flange connections a length of flexible tubing, for example, of rubber, fabric or rubberized fabric. Compared to the cost of the valves, the cost of this tubing is relatively low, and because of its lighter weight, the installation is more easily handled and involves less expense for labor. Furthermore, as is well known, good grades of rubber-impregnated fabrics, such as are commonly used for hose, conveyor belting and the like, are very resistant to abrasion, in this respect being superior to many metals. The closure of this new valve is accomplished by a mechanism that compresses the flexible tubing thus shutting off the flow of materials. Whereas, in the usual type of valve the finely machined working parts are subjected to severe abrasion and are quickly worn and scored, the mechanism of the present invention is completely external to the pipeline. Its operating parts do not come into any contact with the abrasive materials, and, assuming that it will receive the ordinary care and lubrication commonly given to such appliances, its operation should continue indefinitely without any replacements of the working parts. The only part requiring renewal is the flexible tube itself and, as already pointed out, this is by comparison a relatively inexpensive part which is quickly and easily installed by means of two simple flange connections. A more detailed description of the apparatus and its operation follows.

Figure 2:
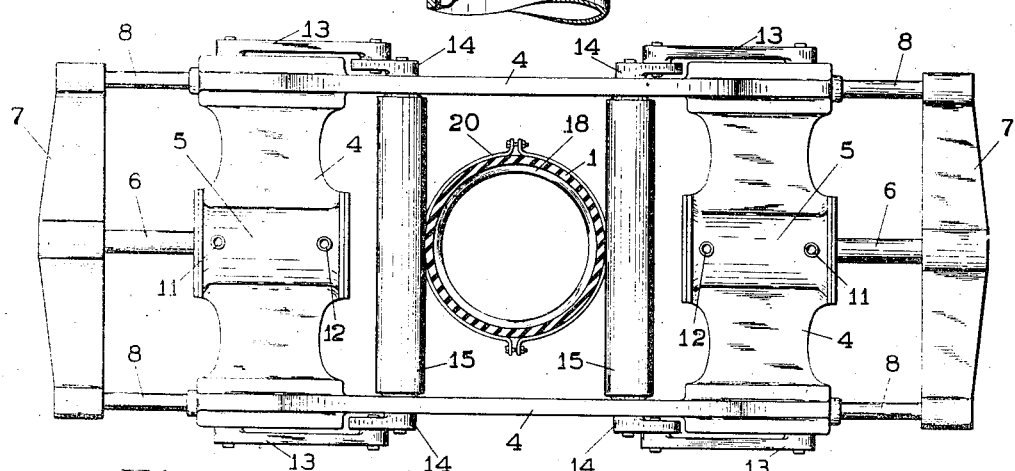

Fig. 1 represents a side elevation of the valve mechanism in operating position on the tube 1 which is partially sectioned to show the upper and the lower flange connections numbered 2 and 3 respectively. Fig. 2 represents the tube and valve mechanism viewed in plan thru section 1, 1 of Fig. 1. The materials, consisting of a mixture of liquids and solids of considerable variation in size, enter at the top and flow downward thru the tube 1 which consists of a flexible material such as rubber, fabric, rubberized fabric or the like, commonly used in making hose for transporting liquids. The diameter of this tube will vary depending on the amount of material to be handled, the sizes of solid particles and other operating conditions, but may be 12 to 16 inches, more or less. The length of the flexible section between flanges will also vary but it is desirable that it be not less than 4 or 5 times the tube diameter in order to allow room for the valve mechanism to operate without undue strain on the tube at the flange connections. The lower flange connection 3 as shown may also be provided with a sliding sleeve 18 and packing ring 19 to minimize the endwise strain that might otherwise tend to pull the tube 1 from its end fittings when the valve mechanism is closed. The tube 1 is further secured to the flange 2 and the sliding sleeve 18, at upper and lower ends respectively, by means of the clamps 20.

The valve mechanism proper consists of a rigid metal frame 4, suitably a casting, carrying a pair of diametrically opposed hydraulic cylinders 5 containing pistons, not shown, operably connected by means of the piston rods 6 and tie bars 7 to the driving rods 8 which operate the crossheads 9 in the crosshead guides 10. Ports 11 and 12 in the cylinders 5 (Fig. 2) represent connections for pipes by means of which a fluid under pressure may be admitted thru control valves, not shown, to either end of the cylinders 5. By allowing fluid to enter under pressure thru ports 11 and setting the control valves to exhaust any fluid ahead of the pistons thru ports 12, the pistons will move inward toward the tube 1 carrying forward the tie bars 7 which in turn force the driving rods 8 and the crossheads 9 to move inward from each side toward the pipe 1, to the closed position.

As the crossheads 9 move forward in the crosshead guides 10, they carry forward the links 13, which are pin-connected at one end to the crossheads 9 and at the other end to the levers 14 carrying the upper rolls 15 and lower rolls 16. The links 13 push the levers 14 inward toward the pipe 1 causing the rolls 15 and 16 to impinge thereon. The upper rolls 15 are guided at both ends by slots 17 in the frame 4. Because the links 13 are pivoted to the levers 14 above the center points in such a way as to form a short lever arm with respect to the upper rolls 15 and a longer lever arm with respect to the lower rolls 16, the inward pressure exerted thru the links 13 tends to force the upper rolls 15 together at a rate somewhat faster than that of the lower rolls 16. This inward motion continues until the tube 1 is closed or until, as more frequently happens, a solid particle is caught between the closing upper rolls 15. As soon as this occurs, the flow of solid materials is substantially blocked, although the liquid may continue to flow in somewhat diminished volume. Because the lower rolls 16 close somewhat more slowly than the upper rolls 15, solids and liquids which have passed beyond the upper rolls 15 before the stoppage occurs are carried by gravity beyond the lower rolls 16 and these are then free to continue moving inward about the axis of upper rolls 15 as a pivot until the tube 1 is completely compressed between lower rolls 16 and the flow of both liquids and solids is completely stopped. It will be evident that the length of the rolls 15 and 16 must be equivalent to or slightly greater than one-half of the circumference of the largest tube which will be employed, in order to allow the flexible tube 1 to be completely flattened between the rolls. The width of the frame 4 will, of course, be determined by this same factor. The vertical distance between the upper rolls 15 and the lower rolls 16 may also be varied but it is desirable that this distance be equivalent to at least the length of the diameter of the largest tube which will be employed and preferably it should be about 1½ to 2 times the tube diameter. These dimensions are approximate and it is possible that certain distances will be found to give the most satisfactory operation under definite conditions of volumes handled, ratio of liquids to solids, particle sizes and the like. These are matters, however, which it is possible to determine by experiment on the part of anyone skilled in the mechanical arts and a variation in these dimensions would in nowise alter the scope of this invention.

By reversing the valves, not shown, controlling the fluid to the cylinders 5 and allowing the fluid under pressure to enter thru ports 12, the fluid ahead of the pistons will exhaust thru ports 11 and the pistons will be forced outward toward the open position shown in the drawing, thus permitting the tube 1 to open and the flow of materials to be resumed.

It is evident that many modifications of the mechanism described might be employed without departing from the spirit of this invention. For example, instead of the frame 4 as shown being cast substantially as one piece with certain portions being machined for moving parts, it might be assembled from separate castings or forgings suitably joined, with the necessary parts machined separately before assembly. Again the rolls 15 and 16, used as pressure members against tube 1, could be rubber covered as a possible means of improving operation; or in the interests of economy of construction, the rolls may be replaced by straight bars of suitable size, rigidly attached to the levers 14. It would also be possible to have one side of the jaw mechanism substituted by a flat, rigid surface against which the other jaw would operate to compress the tube in the same manner as the apparatus illustrated. These and other modifications have been considered and the jaw mechanism as described represents the preferred embodiment of the invention.

It will be apparent also that in place of the hydraulic pressure applied by means of pistons operating in cylinders 5 as shown, other means may be used to cause the valve mechanism to close upon the tube. The hydraulic pressure device is merely one embodiment of the invention showing a suitable method of actuating the valve mechanism. Thus, a screw device operated either by hand or by electric motor might be used to cause the jaws of the valve to move inward with synchronous motion. Other means will no doubt suggest themselves to those skilled in the mechanical arts and it is not my intention to be limited to one source of mechanical power for the operation of the valve closing mechanism herein described, other than as indicated in the appended claims. For example, air or steam pressure may be used.

I claim:

1. A valve for controlling the flow of liquids, solids and mixtures of liquids and solids, said valve comprising a section of flexible tube and a mechanism for successively constricting said tube at a plurality of transverse sections, said mechanism comprising a first means for constricting said tube at a first tranverse section, a second means for constricting said tube at a second transverse section, a connecting means which operably joins said first means to said second means, and a pressure means for applying pressure to said connecting means.

2. A valve for controlling the flow of liquids, solids and mixtures of liquids and solids, said valve comprising a section of flexible tube and a mechanism for constricting said tube, said mechanism comprising a first means for constricting said tube at a first transverse section, a second means for constricting said tube at a second transverse section, a connecting means which operably joins said first means to said second means, a pressure means for applying pressure to said connecting means, said pressure means operating to apply pressure to said connecting means at such a point that constriction of said tube at said first transverse section occurs at a faster rate than constriction of said tube at said second transverse section.

3. A valve for controlling the flow of liquids, solids and mixtures of liquids and solids, said valve comprising a section of flexible tube and a jaw mechanism for successively constricting said tube at two transverse sections, said jaw mechanism comprising a first pair of opposing pressure members situated on opposite sides of said tube and operating across a first transverse section of said tube, a second pair of opposing pressure members operating across a second transverse section of said tube said first pair of pressure members operating prior to operation of said second pair of pressure members, connecting members joining the ends of said pressure members on the same side of said tube, said connecting members being operably joined by links to a source of pressure.

4. A valve for controlling the flow of liquids, solids and mixtures of liquids and solids, said valve comprising a section of flexible tube, and a jaw mechanism for constricting said tube, said jaw mechanism comprising a first pair of opposing pressure members situated on opposite sides of said tube and operating across a first transverse section of said tube, the ends of said first pair of opposing pressure members being guided to move in a direction substantially at right angles to the axis of said tube; a second pair of opposing pressure members operating across a second transverse section of said tube; connecting members joining the ends of said pressure members situated on the same side of said tube, said connecting members being operably joined by links to a source of pressure, said links being joined to said connecting members at an intermediate point such that the distance along said connecting members from said link connections to the points of attachment of said first pair of opposing pressure members is less than the distance from said link connection to the point of attachment of said second pair of opposing pressure members.

5. A valve for controlling the flow of liquids, solids and mixtures of liquids and solids, said valve comprising a section of flexible tube and a jaw mechanism for exerting pressure on said tube, said jaw mechanism comprising an upstream pair and a downstream pair of opposing pressure members, said opposing pressure members of each of said pairs being situated on opposite sides of said tube and substantially at right angles to the axis of said tube, the said pressure members on the same side of said tube being joined at the ends by connecting levers of equal length lying substantially parallel to the axis of said tube and means for applying an inwardly directed pressure simultaneously to said connecting levers so that said pressure is exerted at such points on said connecting levers as to close successively the said upstream pair of opposing pressure members and the said downstream pair of opposing pressure members until said tube is completely constricted.

6. In a valve of the type described a jaw mechanism for exerting pressure on a flexible tube, said jaw mechanism comprising an upstream pair and a downstream pair of opposing pressure members, said opposing pressure members of each of said pairs being situated on opposite sides of said tube, substantially parallel to each other and substantially at right angles to the axis of said tube, the said pressure members on the same side of said tube being joined at the ends by connecting levers of substantially equal length lying substantially parallel to the axis of said tube, said connecting levers being provided with link connections to a source of pressure, the said link connections being attached at such points on the said connecting levers that an inwardly directed pressure applied simultaneously to said connecting levers thru said link connections will operate to close successively the said upstream pair of opposing pressure members and said downstream pair of opposing pressure members until said tube is completely constricted.

WILLING B. FOULKE.